United States Patent [19]

Shinn et al.

[11] 3,917,681

[45] Nov. 4, 1975

[54] PURIFICATION OF ISOPHTHALIC ACID

[75] Inventors: Robert D. Shinn, Midlothian; Willis C. Keith, Tinley Park, both of Ill.

[73] Assignee: Atlantic Richfield Company, Los Angeles, Calif.

[22] Filed: Mar. 29, 1972

[21] Appl. No.: 239,304

Related U.S. Application Data

[63] Continuation-in-part of Ser. No. 827,214, May 23, 1969, abandoned.

[52] U.S. Cl. .............................................. 260/525
[51] Int. Cl. ............................................ C07c 51/42
[58] Field of Search ................................... 260/525

[56] References Cited
UNITED STATES PATENTS

| | | | |
|---|---|---|---|
| 2,734,914 | 2/1956 | McKinnis | 260/525 |
| 2,820,819 | 1/1958 | Aroyan | 260/525 |
| 3,043,870 | 7/1962 | Hetzel | 260/525 |
| 3,364,256 | 1/1958 | Ichikawa | 260/525 |

*Primary Examiner*—James A. Patten
*Attorney, Agent, or Firm*—John R. Ewbank

[57] ABSTRACT

A process for purifying isophthalic acid produced by the air oxidation in the liquid phase of a xylene isomer in an acetic acid diluent is disclosed. The crude acid product is dissolved in an acetic acid-water solvent (75 to 99 wt. percent acetic acid) and passed through a three-stage recrystallization process. About one-third of the isophthalic acid is crystallized in each stage. The second-stage product can be separated to yield isophthalic acid crystals containing essentially no terephthalic acid.

18 Claims, 1 Drawing Figure

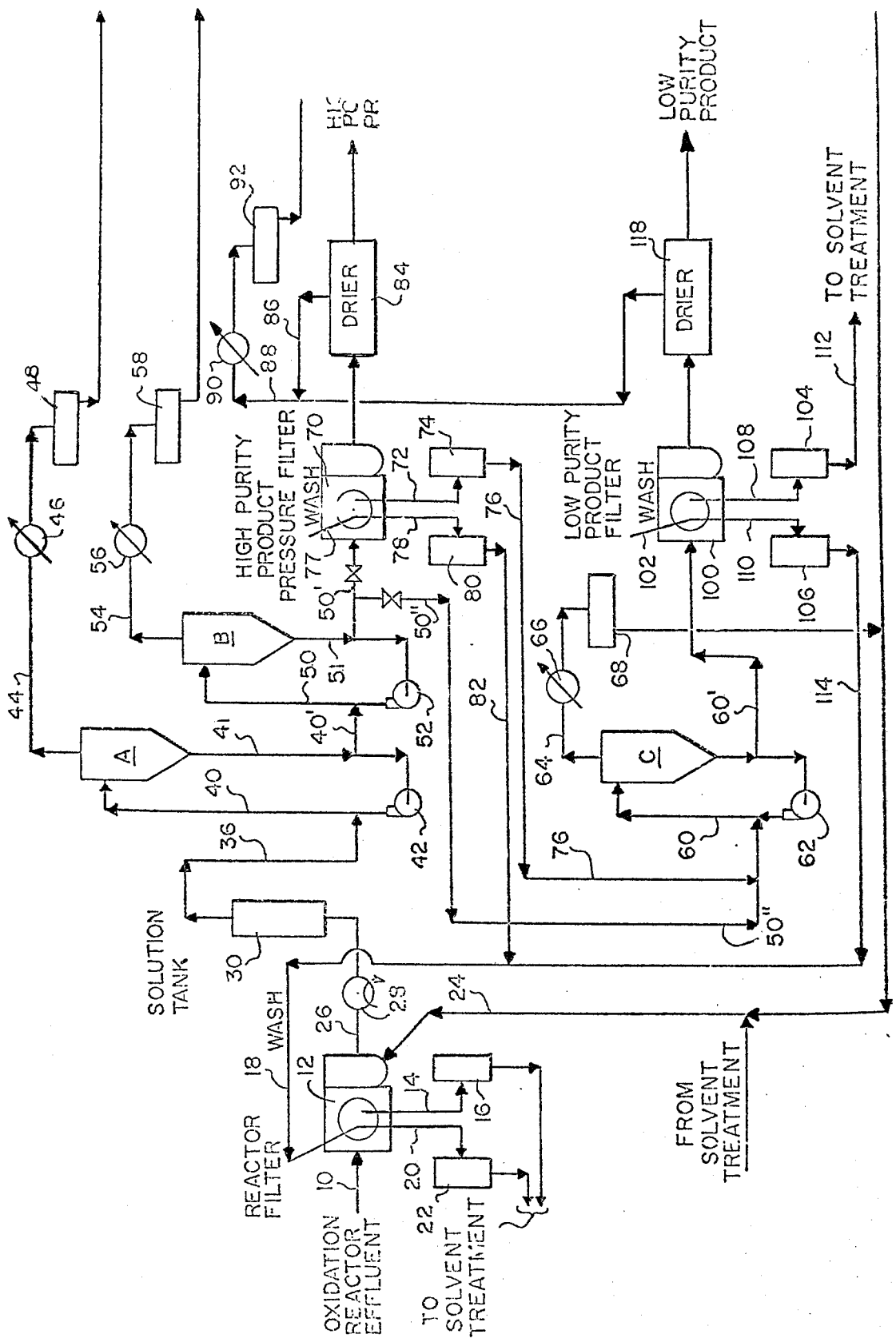

PURIFICATION OF ISOPHTHALIC ACID

This application is a Continuation-in-Part of our earlier filed application Ser. No. 827,214 filed May 23, 1969, which application after allowance was abandoned and replaced by this application.

The present invention relates to a process for purifying isophthalic acid to a relatively high purity.

Various aromatic discarboxylic acids, and particularly isophthalic acid, have come to have considerable commercial importance in the formation of polymers and other products useful in the manufacture of coating compositions, films, fibers and filaments, and many other valuable products. The character of such polymerization reactions, however, requires a relatively high degree of purity in the acids used in these reactions, since the by-products and impurities formed in the production of the acids often interfere with the achievement of desired properties in the polymer. Monomer purity has been found to be particularly significant in the polymerizations of polyester resins intended for use as textile fibers. The necessary purity of such aromatic dicarboxylic acids for use in these reactions has been difficult to achieve in commercial scale plants for the production of isophthalic acid. Accordingly, there is a great need for a purification process for isophthalic acid which is highly effective without unattractive economic requirements such as extensive and expensive equipment, high operating costs, complex operation, and expensive reagents.

Isophthalic acid is commonly produced by the oxidation of the appropriate xylene isomer; i.e. meta-xylene can be oxidized to form isophthalic acid. In general the meta-xylene, dissolved in an inert solvent such as a $C_2$ to $C_4$ carboxylic acid, frequently acetic acid, is contacted with molecular oxygen, often as air, at elevated temperatures and at a pressure sufficient to maintain the xylene and the solvent in the liquid phase. An oxidation catlyst is ordinarily present, and may be, for instance, a soluble cobalt or manganese salt such as cobalt acetate, or other oxidation catalysts. In some cases an oxidation promoter such as a halogen or an aliphatic ketone or aldehyde, e.g. acetaldehyde, may be desirable.

Ordinarily, the product acid is recovered from the reaction mixture by cooling to crystallize the acid followed by separation of the crystals using one of the well known solid-liquid separation techniques, such as filtration, centrifugal separation, decanting, and the like. The crude acid product recovered from such common commercial processes are, however, ordinarily contaminated with relatively large quantities of reaction by-products and other impurities such as the catalyst. The character of the contaminants serves to cause severe difficulties in achieving the high levels of purity required for polymerization processes, particularly for the production of polyester textile fibers.

The particular amount and type of the impurities in the crude acid product often depend upon the incidence of their precursors in the xylene feedstock and upon the conditions of the oxidation reaction. In a meta-xylene feedstock there are often minor, but still appreciable, amounts of other isomers, such as ortho-xylene, para-xylene and ethyl-benzene, and varying amounts of other inpurities such as paraffins and naphthenes of a boiling range approximately the same as the xylenes, which will ordinarily be oxidized under the conditions of the reaction to the corresponding acids or intermediate oxidation products. The meta-xylene feedstock itself may also give rise to reaction intermediates and other by-products. Additional impurities can include metal corrosion products from the equipment, catalyst and solvent residues, and the like. The major components of the impurities will, however, be aromatic acids, including the isomeric forms of the isophthalic acid being produced, toluic acid, and benzoic acid; intermediate oxidation products capable of being reduced, primarily including the isomers of phthaladehydic acid, the isomers of tolualdehyde, and benzaldehyde, collectively referred to hereinafter as reducibles; and trace metal compounds resulting from residues of the catalyst and corrosion in the reaction system, primarily iron and the metal of the catalyst, for instance, cobalt or manganese.

While a rather large number of purification processes have been propounded in the prior art for improving the purity of isophthalic acid, these are either generally ineffective for producing an acid having the desired low level of contamination for commercial production, or involve such complex operations, extensive equipment, and/or edpensive materials as to be economically unattractive for use on a commercial scale. Thus, there is a great need for a purification system for this acid which is highly effective and yet economically attractive. In general, the present invention provides an improved process for the purification of isophthalic acid to effectively produce an acid product having low levels of impurities which is economically attractive by virtue of its simplicity and effectiveness.

An investigation of commercially-available isophthalic acid indicates that the product quality and poor color of such acids are due primarily to the relatively high levels of reducibles and metals in the ostensibly pure product. Other impurities which generally are present usually appear at acceptable levels, although catalyst residue, e.g. cobalt, is sometimes found to be ineffectively removed and present in undersirable amounts. It has now been found, however, that isophthalic acid can be readily purified in accordance with the processes of this invention from an acetic acid-water mixture under controlled conditions by recrystallization to form a product of exceptional purity, color characteristics, and physical properties and ease of handling. The product derived from the recrystallization processes of the present invention is particularly suited for use where exceptional purity is required, notably in polymerization processes designed to provide polyester fibers. The process hereinafter described is dependent on readily controlled parameters and is effective over a broad range of impurity levels, and even adapts easily to accommodate larger and/or rapid fluctuations in impurity levels.

Although variations of recrystallization processes have been suggested heretofore for the purification of isophthalic acid, such processes have not produced on a commercial scale the purity desired, particularly for producing polyester fibers. For instance, it has been suggested to form an aqueous solution of isophthalic acid in the form of the barium salt and reform the acid crystals by treating with a mineral or other acid. Such processes can be relatively effective but are unattractive due to the requirements of large amounts of relatively expensive materials for converting the acid to the salt and the salt back to the acid. The alternative to such operations requiring chemical conversions is to recrystallize the dicarboxylic acid per se without any change in composition. In the prior art, two such processes are common and are thought to be in commercial practice: one process involving the use of water as the solvent medium and another process utilizing isopropanol or mixtures of isopropanol and water as the solvent medium. Many difficulties are associated with these systems, however, including relatively poor product quality, especially color characteristics and crystal size of the recrystallized acid.

In the process of the present invention, isophthalic acid is recrystallized from an acetic acid-water mixture under controlled conditions. The oxidation reaction medium, containing isophthalic acid product and varying amounts of other materials, such as the catalyst reducibles, monobasic acids, and isomeric forms of the product acid, is generally first cooled to crystallize the product, which is then separated by filtration, decantation, or the like, which provides a crude product filter cake contaminated with appreciable amounts of impurities. The crude filter cake is then combined with an acetic acid-water solvent medium, containing from about 75 to 99 weight percent, preferably about 95 to 99 weight percent, and most preferably about 95 percent acetic acid, the essential balance of the solvent mixture being water. The solvent medium is present in an amount at least sufficient to provide a pumpable slurry of the crude product in the solvent but not more than will permit convenient recovery of the acid product from solution by recrystallization. The resultant slurry is heated to dissolve the solids and form a solution and is subjected to a two or three stage crystallization as hereinafter described, the recrystallized product being subsequently recovered by filtration, washed, and dried.

The present invention will now be described in detail with particular reference to the drawing in which:

The FIGURE is a flowsheet of a three-stage crystallization process for the purification of crude isophthalic acid containing impurities such as reducibles, catalyst, and trace metals which is produced by the air oxidation of a meta-xylene feedstock containing a small amount of para-xylene, in the presence of an acetic acid medium using a heavy metal catalyst.

Referring now to the FIGURE, the reaction medium containing isophthalic acid and impurities is withdrawn from the oxidation reactor (not shown), cooled, e.g., to a temperature of about 100° to 110°F., passing through line 10, and subjected to a filtering operation in filter 12. The mother liquor filtrate is removed through line 14 and collected in vessel 16 for subsequent processing to recover solvent and catalyst. The filter cake is washed with an acetic acid-water medium, preferably derived from a later stage of processing for reasons of economy, which is supplied through line 18. The wash filtrate is removed through line 20 and collected in vessel 22 for processing to recover the acetic acid and catalyst. The washed filter cake comprises a crude isophthalic acid product. Approximate typical impurities in the crude isophthalic acid product are shown in Table I.

Table I

| | |
|---|---|
| Catalyst Metal, e.g. Co | 250 – 600 ppm |
| Fe | 5 – 15 " |
| Benzoic acid | 300 " |
| Total Monobasic acids | 15,000 " |
| Reducibles | 0.01 – 0.5 wt. % |
| Terephthalic acid | 0.1 " |
| Isophthalic acid | essential balance |

The crude isophthalic acid can contain up to about 2.0 percent terephthalic acid and monobasic acids to about 30,000 ppm.

The crude filter cake so recovered is slurried in an acetic acid-water medium supplied through line 24 and containing about 75 to 99, preferably about 95 to 99, weight percent acetic acid and the balance water. An especially preferred medium contains about 95 weight percent acetic acid and about 5 weight percent water. The crude acid and the solvent medium can be combined in a solvent-to-solids weight ratio of about 10 to 40:1, preferably about 20 to 30:1. A particularly desirable solvent-to-solids ratio is about 24:1. It is desirable in making up the slurry to utilize, for at least a portion of the solvent medium, acetic acid recovered in later stages of processing. Sufficient fresh acetic acid is utilized to provide the appropriate solvent-to-solids ratio and to accommodate the impurities in the crude acid. A ratio of fresh solvent to return solvent of about 1:1 is especially effective to produce the desired effect although ratios of about 3 to 1:1 of fresh solvent to return solvent can often be used.

The slurry so formed is passed through line 26 to heat exchanger 28 where it is heated, with mixing, at a temperature and a pressure sufficient to effect dissolution of essentially all of the crude isophthalic acid in the solvent medium. The temperature will often be about 250° to 400°F., preferably about 300° to 350°F., and pressures of about 30 to 150 psig, particularly about 40 to 80 psig are suitable. At a solvent-to-solids ratio of about 24:1, it is preferred to utilize a temperature of about 320°F. at about 65 psig. At elevated temperatures, acetic acid is very corrosive, and it is therefore desirable to maintain a relatively low temperature, but it should be noted that essentially all the isophthalic acid must be dissolved in the solvent medium. To insure complete solution, the heater effluent is fed to vessel 30, where it is mixed, at the desired temperature for a holding time sufficient to effect dissolution, e.g., about 5 to 15 minutes, or even more.

The solution is then passed through line 36 to a staged crystallization zone, comprising in one embodiment of the invention three serially-arranged continuous crystallizers A, B and C each having external circulation provided by pumps 42, 52 and 62, respectively, in lines 40, 50, and 60. The hot solution in line 36 is fed into the circulation line 40 of the first crystallizer and into the first crystallizer A at a sufficient pressure to maintain a liquid phase and preferably to prevent flashing of the solvent. The external circulation stream passing through line 41, pump 42 and line 40 is a slurry of isophthalic acid crystals in the acetic acid-water solvent medium, at about the temperature of the first crystallizer. The net feed and the circulating stream are combined in proportions such that the temperature of the composite stream is about 0° to 150°F. above the temperature of the first crystallizer, and will generally be about 0° to 5°F., preferably about 0° to 2°F., above. The composite feed is then introduced into the first stage crystallizer. The feed is preferably tangentially introduced into the first stage crystallizer. Tangential introduction promotes mixing in the crystallizer vessel. Also the feed is introduced below the surface level of the liquid in the crystallizer. Introduction of the feed below the liquid surface prevents uncontrolled flashing of the solvent. Crystallizer A is operated at a temperature of about 180° to 375°F., preferably about 180° to 265°F., most preferably 220° to 250°F. with a holding time of at least about ½ hour, preferably about ½ to 3 hours, often at a pressure of about 15 to 110 psia, preferably, about 17 to 20 psia. An especially desirable operation wherein the feed solution is about 320°F. entails maintenance of a temperature of about 235°F., a pressure of about 17 psia, and a holding time of about one hour in crystallizer A. Acetic acid-water solvent medium is removed via an overhead line 44. The pressure is controlled to maintain the desired temperature in the crystallizer. The solvent removal is at a rate sufficient to maintain the temperature in the crystallizer. The solvent vapors are condensed in heat exchanger 46 and collected in vessel 48.

In crystallizer A, crystallization is promoted and controlled by temperature and by solvent removal. At the temperature and pressure of operation of the first stage crystallizer, about one third to one half of the isophthalic acid can often be crystallized from solution. The external circulation stream 41 provides for circulation rates sufficient to provide a complete turnover, i.e., displacement of the contents of the crystallizer, of material in about ⅓ to 10 minutes, preferably about ½ to 3 minutes. The crystallizer can be conveniently elevated to provide the desired line pressure. A stream is continuously withdrawn from the external circulation line 41 in an amount which, when combined with the solvent removed from the crystallizer as overhead, balances the net feed to the crystallizer. This stream, a slurry of the isophthalic acid crystals in the solvent, is passed through line 40' to the second stage crystallizer B.

The second stage crystallizer B is operated under different conditions than the first, but the operating procedure is essentially the same. The second crystallizer is operated at a temperature of about 105° to 265°F. or slightly higher, preferably about 105° to 170°F., and most preferably 130° to 150°F. with a holding time of at least about ½ hour, preferably about ½ to 3 hours, a pressure of often below atmospheric and up to about 13 psig, preferably about 1 to 5 psia. The solvent removal via overhead line 54 is maintained at a rate sufficient to maintain the temperature while the circulation rate of the slurry in line 50 is sufficient to provide turnover of the material in about ⅓ to 10 minutes, preferably about ½ to 3 minutes. Particularly preferred operation of the number two crystallizer uses a temperature of about 130°F., a pressure of about 2 to 3 psia, and a holding time of about one hour. The feed entering second stage crystallizer B from the first stage crystallizer A in line 40' is a slurry containing the isophthalic acid, with, for instance, about one third as crystals and the balance in solution in the acetic acid-water solvent medium. The crystals have ranged in size from about 100 mesh to pan with about 50 percent from about 300 to 400 mesh. In the second stage operation, additional nucleation occurs, but the primary effect is growth of existing crystals to a larger size which in some work has ranged from about 100 to 400 mesh, with about 50 percent from about 200 to 300 mesh. The specific size ranges may vary depending on, among other factors, the size of the system. About a second one-third to one-half of the original isophthalic acid can often crystallize in the second stage crystallizer, leaving about from about 1 percent to about one third in solution. The solvent vapors are condensed in heat exchanger 56 and collected in vessel 58.

The slurry is continuously withdrawn from the external circulation line 51 of the second crystallizer B and can be passed through line 50' to a solid-liquid separation zone 70, where a crystallized product is recovered in high purity form, or the slurry stream can be passed directly to the third stage crystallizer C through line 50'', or the slurry can be divided, with a portion being passed to the separation zone through line 50' and a second portion passing directly to the third crystallizer C through line 50''. The filtrate from the separation zone 70, if utilized, can be passed to the third stage crystallizer through line 72, vessel 74 and line 76. Material passed to the high purity separation zone 70, which preferably is a rotary filter or the like, is separated at the temperature of the second stage crystallizer B, which is sufficient to maintain essentially all the impurities in solution. The solid crystals can be washed, e.g., with a mixture of about 95 percent acetic acid and about 5 percent water supplied through line 77 in a wash-to-solids ratio of about 5 to 1:1, preferably about 2.7:1. The wash filtrate can be collected through line 78 in vessel 80 and then sent to the reactor filter as wash through lines 82 and 18. The high purity crystals are passed through dryer 84 and cooled to provide isophthalic acid having, for instance, the maximum impurity levels indicated in Table II. Quite often, the high purity product contains less than the specified maximum impurity levels. The Table II levels are based on a process using a feed having the impurity levels shown in Table I.

Table II

| | |
|---|---|
| Cobalt | 1 ppm. |
| Iron | 1 ppm. |
| Benzoic Acid | 10 ppm. |
| Monobasic Acids | 75 ppm. |
| Reducibles | 0.01 wt. % |
| Terephthalic | 0.1 wt. % |

The solvent vapors from drier 84 are removed through lines 86 and 88, and condenser 90 to vessel 92.

The slurry effluent withdrawn from the second stage crystallizer and/or the filtrate from the high purity product filter 70 can, as mentioned, be fed to a third stage crystallizer C. The conditions of operation in the optional third stage include a temperature of about 105° to 170°F., preferably about 105° to 125°F., pressures often below atmospheric, preferably about 1 to 3 p.s.i.a., with a holding time of at least about ½ hour, preferably about 1 to 3 hours. The solvent removal via overhead line 64 is maintained at a rate sufficient to maintain the temperature in the crystallizer while the circulation rate of the slurry in line 60 is sufficient to provide turnover of the material in about ⅓ to 10 minutes, preferably about ½ to 3 minutes. Particularly desirable operation involves a temperature of about 113°F., a pressure of about 1.1 p.s.i.a., and a holding time of about one hour. In the third stage crystallizer crystal growth again predominates, often to provide a slurry containing essentially about 90 to 99 weight percent of the total isophthalic acid as crystals. The overhead from crystallizer C can pass to condenser 66 and then into vessel 68.

The slurry is continuously withdrawn through line 60' from the external circulation line 60 of the third stage crystallizer C and passed to a second liquid-solid separation, e.g., filtration, decantation or centrifugal, or the like, zone 100 for removal of the crystals. Particularly desirable separation again may be achieved utilizing a rotary drum filter or the like. The separated crystals are washed with a medium, e.g., with a 95 weight percent acetic acid-5 weight percent water mixture, supplied through line 102 in a wash-to-solids ratio of about 5 to 1:1, preferably about 2.8:1. Separate filtrate receivers 104 and 106 are ordinarily utilized for the mother liquor removed through line 108 and the wash removed through line 110, with the mother liquor being passed through line 112 to a solvent treatment zone and the wash filtrate being recycled through line 114 and 18 to the reactor filter to serve as the wash medium, or at least a portion thereof. The acetic acid overhead from each crystallizer in vessels 48, 58 and 68, along with acetic acid recovered by driers 84 and 118 can conveniently be recycled through lines 116 and 24 to form at least a portion of the crude product solvent medium as aforementioned.

The washed product crystals are passed through dryer 118 which can be heated, for example, by an inert gas or by heat exchange, and cooled to provide the final low purity isophthalic acid product, having the approximate maximum impurity levels shown in Table III. The drier overhead can be passed to vessel 92 via line 88. The Table III impurity levels are based on the process of the instant invention using a feed as shown in Table I.

TABLE III

| Cobalt | 1 ppm. |
|---|---|
| Iron | 1 ppm. |
| Benzoic Acid | 50 ppm. |
| Monobasic Acids | 100 ppm. |
| Reducibles | .02 wt. % |
| Terephthalic Acid | 0.5 to 4 wt. % |

When the entire slurry withdrawn from the second stage crystallizer B is passed directly to the third stage crystallizer C, relatively little terephthalic acid will appear in the single final product, for instance about 0.8 percent in one example. On the other hand, recovery of the crystals in the slurry from the second stage in the high purity product filter from the entire second stage effluent results in a higher purity product containing essentially no terephthalic acid and a relatively low purity product following the third crystallizer C containing, for instance, about 3.8 percent terephthalic acid in the same example. The minimum ratio of low purity product-to-high purity product in this example is thus about 0.27:1 when all the second stage crystallizer is treated to recover high purity product. The maximum ratio occurs when no high purity product is recovered. Diversion of only a part of the second stage crystallizer effluent directly to the third stage crystallizer with the high purity product filter effluent results in a reduction in the amount of high purity product yield by the amount of crystals in the by-pass stream. The increased amount of isophthalic acid recovered in the low purity product has a reduced percentage content of terephthalic acid, since the amount of terephthalic acid in the system is fixed while the amount of isophthalic acid is increased. The variations in relative amounts, and the concurrent variations in the quality of the low purity product made possible by the present process can be adjusted according to marketing requirements.

The following example serves to further illustrate the invention.

EXAMPLE

A high purity stream of meta-xylene containing a small amount of para-xylene is air oxidized in the presence of an acetic acid medium using a cobalt acetate oxidation catalyst. The oxidation reactor effluent, at a rate of 49.5 gpm is cooled to about 107°F. and filtered on a rotary drum filter. An acetic acid stream is provided from the product filter wash filtrate as wash medium in a solvent-to-solids ratio of 2.9:1. Separate receivers are utilized for the mother liquor and the wash filtrates. The mother liquor is routed to a separate catalyst and solvent recovery system and the wash is routed to an acetic acid recovery system.

The crude isophthalic acid filter cake has a typical composition shown in Table IV, together with a typical analysis of the purified products. The crude filter cake is slurried at a solvent-to-solids ratio of 24:1 in a solvent medium of 95 weight percent acetic acid and 5 weight percent water, derived from the overhead from the crystallizers as described above and fresh acetic acid in a ratio of about 1:1. The slurry is heated by indirect heat exchange to 320°F. and fed at a 190 gpm to the solution tank to dissolve the phthalic acids. The solution tank is held at 320°F. and 56 p.s.i.a. to prevent vaporization, with a holding time of ten minutes to assure complete solution. Effluent from the solution tank is fed into the external circulation line of the first stage crystallizer, where it is combined with a 6000 gpm external circulation flow. The first crystallizer is operated at a temperature of 275°F., and a pressure of 34 psia. The solvent is removed overhead at a vapor rate of 1,500 SCF/M. and the crystallizer is elevated to provide a line pressure of 65 psia at the net feed entry line. The holding time in the crystallizer is one hour, and the external circulation rate provides a turnover of once every 2 minutes. The effluent slurry withdrawn from the external circulation line at 275°F. has a solvent-to-solids ratio, based on total isophthalic acid, of 21:1, due to the removal of solvent overhead. The slurry is passed at a rate of 170 gpm to the second stage crystallizer which is operated at a temperature of 234°F., 16.7 psia pressure, an overhead solvent vapor rate of 1200 SCF/M, a holding time of one hour, and a turnover rate of once every 2 minutes. The second crystallizer is elevated to provide a line pressure of 35 psia at the net feed entry line. An external circulation rate of 6,000 gpm is provided. The effluent of the second stage crystallizer is processed in three separate manners in this example. First, the entire stream, 150 gpm, is passed to the high purity product filter, with only the mother liquor passing to the third stage crystallizer, to produce 2800 pounds per hour of the high purity product and 1000 pounds per hour of lower purity product. Secondly, the entire stream is passed directly to the third stage crystallizer to produce no high purity product and 3,800 pounds per hour of lower purity product. In the third operation, 68 percent of the stream is passed to the high purity product filter and 32 percent is passed directly to the third stage crystallizer with the mother liquor filtrate from the high purity product filter, producing 1,900 pounds per hour of each grade product.

The high purity product filter is operated at 234°F., and the mother liquor is collected and passed to the third crystallizer. The filter cake is washed with fresh 95 percent acetic acid at 2.7:1 solvent-to-solids ratio, and the wash is passed to the reactor effluent filter as wash. The isophthalic acid crystals are dried and cooled. A typical analysis appears in Table IV.

The mother liquor filtrate and/or second stage crystallizer effluent enter the 6,000 gpm external circulation line of the third stage at 16.7 psia. The third stage crystallizer is operated at 113°F., 1.1 psia, with overhead vapor rate of 3,100 SCF/M, a holding time of one hour, and a turnover rate of once a minute. The effluent from the third stage crystallizer is passed to the lower purity product filter, and the mother liquor filtrate is passed to a separate solvent recovery system. The filter cake is washed with 95 percent acetic acid at a 2.7:1 wash-to-solids ratio, and the wash filtrate is passed to the reactor filter as wash. The isophthalic acid crystals are dried and cooled to provide the lower purity product. Typical analyses are shown in Table IV.

cient to provide a complete turnover of the material in the said crystallization zone in about ⅓ to 10 minutes and further wherein part of the slurry withdrawn from the second crystallization zone is recycled back into the said crystallization zone at a rate sufficient to provide a complete turnover of the material in the said second crystallization zone in about ⅓ to 10 minutes.

5. The process of claim 4 wherein the part of each of the slurries to be recycled into each of the first and second crystallization zones, respectively, is combined with the feed entering each of said crystallization zones prior to introduction into each of said crystallization zones.

6. The process of claim 5 wherein each of the said crystallization zones is elevated above the point at which the feed is combined with the recycle and the resulting combined stream enters below the liquid level in each of said crystallization zones.

TABLE IV

|  | Feed | High Purity |  |  | Lower Purity |  |  |
|---|---|---|---|---|---|---|---|
| % 2'd Stage Crystallizer Effluent directly processed | — | 100 | 0 | 63.5 | 0 | 100 | 36.5 |
| Lbs./Hr. |  | 2,794.5 | 0 | 1,902.5 | 1010.5 | 3,805 | 1902.5 |
| Cobalt, ppm | 316 | <1 | — | <1 | 1 | 1 | 1 |
| Iron, ppm | 9 | <1 | — | <1 | 1 | <1 | <1 |
| Benzoic acid, ppm | 150 | ~0 | — | ~0 | ~0 | ~0 | ~0 |
| Monobasic acid, ppm | 4650 | 75 | — | 75 | 75 | 75 | 75 |
| Reducibles, wt. % | 0.13 | 0.01 | — | 0.01 | 0.02 | 0.02 | 0.02 |
| Terephthalic acid, wt. % | 0.14 | ~0 | — | ~0 | 3.8 | 0.8 | 1.7 |

We claim:

1. A process for the purification of isphthalic acid produced by the liquid phase, oxygen-containing gas oxidation of meta-xylene containing a small amount of paraxylene which comprises passing to a first crystallization zone, a solution of the crude, solid oxidation product in a medium containing water and about 75 to 99 weight percent acetic acid at a temperature sufficient to effect dissolution of essentially all of the isophthalic acid in the medium, withdrawing vaporized acetic acid from said first crystallization zone at a temperature of about 180° to 375°F. and pressure sufficient to maintain a liquid phase to crystallize isophthalic acid from said solution, passing the resulting slurry of isophthalic crystals from said first crystallization zone to a second crystallization zone, withdrawing vaporized acetic acid from said second crystallization zone to maintain a temperature which is significantly lower than the first crystallization zone but sufficient to maintain essentially all impurities in solution and at a pressure sufficient to maintain a liquid phase, which temperature is within the range from about 105° to 265°F. and recovering isophthalic acid of increased purity from slurry withdrawn from said second crystallization zone.

2. The process of claim 1 wherein the crystallized isophthalic acid solids are separated from said slurry withdrawn from said second crystalliztion in a solid-liquid separation zone.

3. The process of claim 1 wherein said first crystallization zone is maintained at a temperature of from about 220° to 250°F. and a pressure of from about 17 to 20 p.s.i.a. and said second stage is maintained at a temperature of 130° to 150°F. and a pressure of from about 1 to 5 p.s.i.a.

4. The process of claim 1 wherein part of the slurry withdrawn from the first crystallization zone is recycled back into the said crystallization zone at a rate suffi- 7. The process for the purification of isophthalic acid produced by the liquid-phase, oxygen-containing gas oxidation of meta-xylene containing a small amount of para-xylene and in the presence of an acetic acid solvent, which comprises passing to a first crystallization zone a solution of the crude, solid oxidation product in a medium containing acetic acid and water containing about 75 to 99 weight percent acetic acid, said first crystallization zone being maintained at a temperature of about 180° to 375°F., a pressure of about 15 to 110 p.s.i.a., and a holding time of at least ½ hour, withdrawing vaporized acetic acid from said first crystallization zone at a rate sufficient to maintain the temperature in said first crystallization zone and to crystallize isophthalic acid from said solution, passing the resulting slurry of isophthalic crystals from said first crystallization zone to a second crystallization zone, said second crystallization zone being maintained at a temperature of about 105° to 265°F., a pressure of from below atmospheric to about 13 p.s.i.g. and a holding time of at least ½ hour, withdrawing vaporized acetic acid from said second crystallization zone at a rate sufficient to maintain the temperature in the second crystallization zone and recovering isophthalic acid of increased purity from slurry withdrawn from said second crystallization.

8. The process of claim 7 wherein the crystallized isophthalic acid solids are separated from said slurry withdrawn from said second crystallization in a solid-liquid separation zone.

9. The process of claim 7 wherein slurry from the second crystallization zone is passed to a third recrystallization zone, said third recrystallization zone being maintained at a temperature of from about 105° to 170°F., a pressure below atomspheric and a holding time of from about ½ to 3 hours, withdrawing vaporized acetic acid from said third recrystallization zone at rate sufficient to maintain the temperature in the said third crystallization zone and the resulting slurry is passed to a solid-liquid separation zone wherein the crystallized isophthalic acid crystals are separated from said slurry.

10. The process of claim 7 wherein said first crystallization zone is maintained at a temperature of from about 265° to 285°F., a pressure of about 30 to 40 p.s.i.a., and a holding time of ½ to 3 hours and said second crystallization zone is maintained at a temperature of about 230° to 240°F., a pressure of about 2 to 5 p.s.i.g. and a holding time of about ½ to 3 hours.

11. The process of claim 10 wherein the crystallized isophthalic acid solids are separated from said slurry withdrawn from said second crystallization zone by filtration to provide solid isophthalic acid crystals containing less than about 0.8 weight percent terephthalic acid as an impurity.

12. The process of claim 10 wherein part of the slurry withdrawn from the first crystallization zone is recycled back into the said crystallization zone at a rate sufficient to provide a complete turnover of the material in the said crystallization zone in about ⅓ to 10 minutes and further wherein part of the slurry withdrawn from the second crystallization zone is recycled back into the said crystallization zone at a rate sufficient to provide a complete turnover of the material in the said second crystallization zone in about ⅓ to 10 minutes.

13. The process of claim 12 wherein that part of each of the slurries to be recycled into each of the first and second crystallization zones, respectively, is combined with the feed entering each of said crystallization zones prior to introduction into each of said crystallization zones.

14. The process of claim 13 wherein each of the said crystallization zones is elevated above the point at which the feed is combined with the recycle and the resulting combined stream enters below the liquid levels in each of said crystallization zones.

15. The process of claim 10 wherein the slurry from the second crystallization zone is passed to a third crystallization zone maintained at a temperature of about 105° to 125°F., a pressure of about 1 to 3 p.s.i.a. and a holding time of about 1 to 3 hours, withdrawing sufficient vaporized acetic acid from the third crystallization zone to maintain the temperature within said zone, and passing the resulting slurry to a solid-liquid separation zone wherein solid isophthalic acid crystals containing less than about 3.8 weight percent terephthalic acid as an impurity are removed by filtration.

16. The process of claim 15 wherein part of the slurry withdrawn from the first crystallization zone is recycled back into the said crystallization zone at a rate sufficient to provide a complete turnover of the material in the said crystallization zone in about ⅓ to 10 minutes and further wherein part of the slurry withdrawn from the second crystallization zone is recycled back into the said crystallization zone at a rate sufficient to provide a complete turnover of the material in the said second crystallization zone in about ⅓ to 10 minutes.

17. The process of claim 16 wherein that part of each of the slurries to be recycled into each of the first and second crystallization zones, respectively, is combined with the feed entering each of said crystallization zones prior to introduction into each of said crystallization zones.

18. The process of claim 17 wherein each of the said crystallization zones is elevated above the point at which the feed is combined with the recycle and the resulting combined stream enters below the liquid level in each of said crystallization zones.

* * * * *